US012794040B2

(12) United States Patent
Marcath et al.

(10) Patent No.: US 12,794,040 B2
(45) Date of Patent: Nov. 10, 2026

(54) TRACTION BATTERY CROSS-MEMBER ASSEMBLY

(71) Applicant: Ford Global Technologies, LLC, Dearborn, MI (US)

(72) Inventors: Jason C. Marcath, Dearborn, MI (US); Michael E. Reibling, Sterling Heights, MI (US); Ryan Douglas Matulich, Farmington, MI (US); Karen Siler, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 18/788,624

(22) Filed: Jul. 30, 2024

(65) Prior Publication Data

US 2025/0187419 A1 Jun. 12, 2025

Related U.S. Application Data

(60) Provisional application No. 63/607,888, filed on Dec. 8, 2023.

(51) Int. Cl.

*B60N 2/005* (2006.01)
*B60K 1/04* (2019.01)

(Continued)

(52) U.S. Cl.

CPC ................ *B60N 2/005* (2013.01); *B60K 1/04* (2013.01); *B60L 50/60* (2019.02); *B60L 50/64* (2019.02); *H01M 10/625* (2015.04); *H01M 50/204* (2021.01); *H01M 50/242* (2021.01); *H01M 50/244* (2021.01); *H01M 50/258* (2021.01); *H01M 50/271* (2021.01); *H01M 50/289* (2021.01); *B60K 2001/0438* (2013.01); *B60L 50/66* (2019.02); *H01M 2220/20* (2013.01)

(58) Field of Classification Search

CPC .. B60N 2/005; H01M 10/625; H01M 50/289; H01M 50/242; H01M 50/244; H01M 50/258; H01M 50/204; H01M 50/271; H01M 2001/0438; B60L 50/64; B60L 50/60; B60L 50/66; B60K 1/04; B60K 2001/0438

USPC .......................................................... 180/68.5

See application file for complete search history.

(56) References Cited

U.S. PATENT DOCUMENTS

| | | | | |
|---|---|---|---|---|
| 9,755,212 | B2 | 9/2017 | Kedir et al. | |
| 10,559,793 | B2 * | 2/2020 | Smith | B60K 1/04 |

(Continued)

FOREIGN PATENT DOCUMENTS

| | | | | |
|---|---|---|---|---|
| CA | 2661652 A1 * | 10/2009 | | H01M 50/136 |
| CN | 117691285 A * | 3/2024 | | H01M 50/209 |

(Continued)

OTHER PUBLICATIONS

U.S. Appl. No. 18/595,843, filed Mar. 5, 2024.

*Primary Examiner* — James A Shriver, II

(74) *Attorney, Agent, or Firm* — David B. Kelley; Carlson, Gaskey & Olds, P.C.

(57) ABSTRACT

A method of assembling a battery pack includes positioning one or more terminals of a cell stack within a slot that is provided by a frame of a cross-member assembly. The method further includes securing a beam of the cross-member assembly to the frame after the positioning. The beam can be a pultruded beam that covers several slots of the frame.

20 Claims, 5 Drawing Sheets

(51) Int. Cl.

| | |
|---|---|
| ***B60L 50/60*** | (2019.01) |
| ***B60L 50/64*** | (2019.01) |
| ***H01M 10/625*** | (2014.01) |
| ***H01M 50/204*** | (2021.01) |
| ***H01M 50/242*** | (2021.01) |
| ***H01M 50/244*** | (2021.01) |
| ***H01M 50/258*** | (2021.01) |
| ***H01M 50/271*** | (2021.01) |
| ***H01M 50/289*** | (2021.01) |

(56) References Cited

U.S. PATENT DOCUMENTS

| | | | | |
|---|---|---|---|---|
| 11,145,936 | B2 | 10/2021 | Roberts et al. | |
| 11,223,093 | B2 | 1/2022 | Hong et al. | |
| 11,251,486 | B2 * | 2/2022 | Popovski | H01M 50/264 |
| 11,670,813 | B2 * | 6/2023 | Piggott | H01M 50/15 429/120 |
| 2020/0313261 | A1 * | 10/2020 | Piggott | H01M 10/6553 |
| 2020/0373529 | A1 * | 11/2020 | Popovski | H01M 50/264 |
| 2024/0313361 | A1 * | 9/2024 | Quan | H01M 50/548 |
| 2025/0187419 | A1 * | 6/2025 | Marcath | B23K 26/21 |
| 2025/0192377 | A1 * | 6/2025 | Perumalla | B23K 26/21 |
| 2025/0192379 | A1 * | 6/2025 | Maguire | B23K 26/21 |

FOREIGN PATENT DOCUMENTS

| | | | | | |
|---|---|---|---|---|---|
| CN | 121002714 | A | * | 11/2025 | B60K 1/04 |
| CN | 115513561 | B | * | 3/2026 | H01M 10/46 |
| DE | 102024112624 | A1 | * | 11/2025 | H01M 50/503 |
| DE | 102024113426 | A1 | * | 11/2025 | H01M 50/51 |
| DE | 212024000316 | U1 | * | 2/2026 | H01M 10/6555 |
| KR | 20240086512 | A | * | 6/2024 | H01M 50/249 |
| KR | 102850081 | B1 | * | 8/2025 | H01M 50/591 |
| WO | WO-2015113854 | A2 | * | 8/2015 | H01M 50/505 |
| WO | WO-2024117692 | A1 | * | 6/2024 | H01M 50/507 |

* cited by examiner

TRACTION BATTERY CROSS-MEMBER ASSEMBLY

CROSS-REFERENCE TO RELATED APPLICATIONS

This disclosure claims priority to U.S. Provisional Application No. 63/607,888, which was filed on Dec. 8, 2023, and is incorporated herein by reference in its entirety.

TECHNICAL FIELD

This disclosure relates generally to positioning tab terminals during assembly of a traction battery pack.

BACKGROUND

Electrified vehicles differ from conventional motor vehicles because electrified vehicles can be selectively driven by one or more electric machines that are powered by a traction battery pack. The electric machines can propel the electrified vehicles instead of, or in combination with, an internal combustion engine. The traction battery pack is discharged when powering the one or more electric machines and other loads of the electrified vehicle.

SUMMARY

In some aspects, the techniques described herein relate to a method of assembling a battery pack, including: positioning one or more terminals of a cell stack within a slot that is provided by a frame of a cross-member assembly; and securing a beam of the cross-member assembly to the frame after the positioning.

In some aspects, the techniques described herein relate to a method, wherein the securing includes adhesively securing the beam to the frame.

In some aspects, the techniques described herein relate to a method, further including, during the securing, additionally securing the beam to a thermal exchange plate, the cell stack disposed on the thermal exchange plate.

In some aspects, the techniques described herein relate to a method, wherein the frame is a first section of the frame, and further including securing a second section of the frame to the first section of the frame, the first section providing a first portion of the slot, the second section providing a second portion of the slot.

In some aspects, the techniques described herein relate to a method, wherein the beam is secured to the second section of the frame when the second section is secured to the first section.

In some aspects, the techniques described herein relate to a method, wherein the beam is a first beam, and further including positioning the one or more terminals within the slot of the frame, wherein a second beam is secured to the frame when positioning the one or more terminals within the slot of the frame.

In some aspects, the techniques described herein relate to a method, wherein the first beam is a vertically lower beam and the second beam is a vertically upper beam.

In some aspects, the techniques described herein relate to a method, wherein, after the positioning and the securing, the terminals are disposed vertically between the first beam and the second beam.

In some aspects, the techniques described herein relate to a method, further including securing a plurality of busbars to the frame after securing the beam to the frame.

In some aspects, the techniques described herein relate to a method, wherein securing the plurality of busbars includes heat staking the plurality of busbars to the frame.

In some aspects, the techniques described herein relate to a method, further including folding the one or more terminals over the plurality of busbars, and then securing the one or more terminals to the plurality of busbars after the folding.

In some aspects, the techniques described herein relate to a method, wherein, after the securing, the beam covers at least a portion of the slot.

In some aspects, the techniques described herein relate to a method, wherein the positioning includes sliding the frame relative to the one or more terminals.

In some aspects, the techniques described herein relate to a method, wherein the cross-member assembly is a first cross-member assembly disposed along a first side of the cell stack, the frame is a first frame, and the beam is a first beam, and further including positioning one or more terminals within respective slots of a second frame of a second cross-member assembly, and securing a second beam of the second cross-member assembly to the second frame.

In some aspects, the techniques described herein relate to a traction battery pack assembly, including: a frame of a cross-member assembly; a beam of the cross-member assembly; and a plurality of tab terminals each extending through a slot in the frame, the beam secured to the frame in a position that covers at least some of the slot.

In some aspects, the techniques described herein relate to a traction battery pack assembly, wherein the beam is a pultruded beam.

In some aspects, the techniques described herein relate to a traction battery pack assembly, wherein the beam is vertically beneath the plurality of tab terminals.

In some aspects, the techniques described herein relate to a traction battery pack assembly, including: a first section of a frame of a cross-member assembly; a second section of the frame of the cross-member assembly, the second section secured to the first section; and a plurality of tab terminals each extending through a slot in the frame, the first section providing a first portion of the slot, the second section providing a second portion of the slot.

In some aspects, the techniques described herein relate to a traction battery pack assembly, wherein the first section is snap-fit to the second section to secure the first section to the second section.

In some aspects, the techniques described herein relate to a traction battery pack assembly, wherein a first beam is a secured to first section of the frame, and a second beam is secured to a second section of the frame.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details example cross-member assemblies of a battery pack. The cross-member assemblies have a frame with busbars. The frame has at least one slot that, during assembly, receives terminals and helps to locate the terminals relative to the busbars. The assembly further includes at least one beam.

Figure 1:
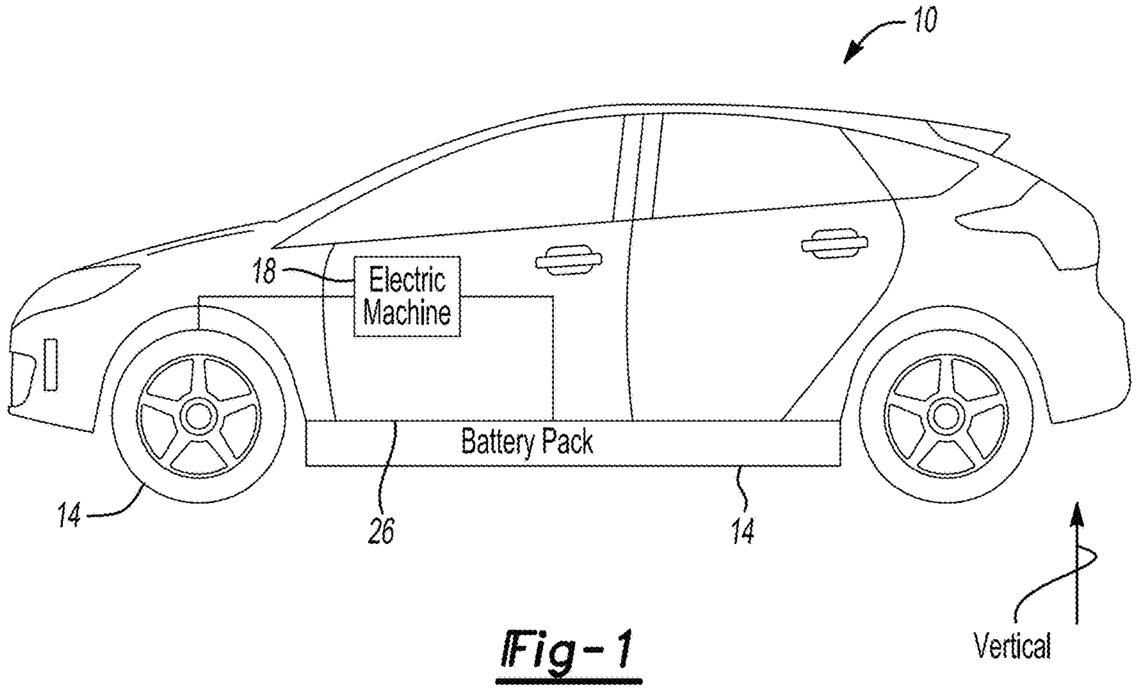
FIG. 1 illustrates a side view of an electrified vehicle.

With reference to FIG. 1, an electrified vehicle 10 includes a battery pack 14, an electric machine 18, and wheels 22. The battery pack 14 powers an electric machine 18, which can convert electrical power to mechanical power to drive the wheels 22. The battery pack 14 is thus a traction battery pack.

The battery pack 14 is, in the exemplary embodiment, secured to an underbody 26 of the electrified vehicle 10. The battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a battery pack.

Figure 3:
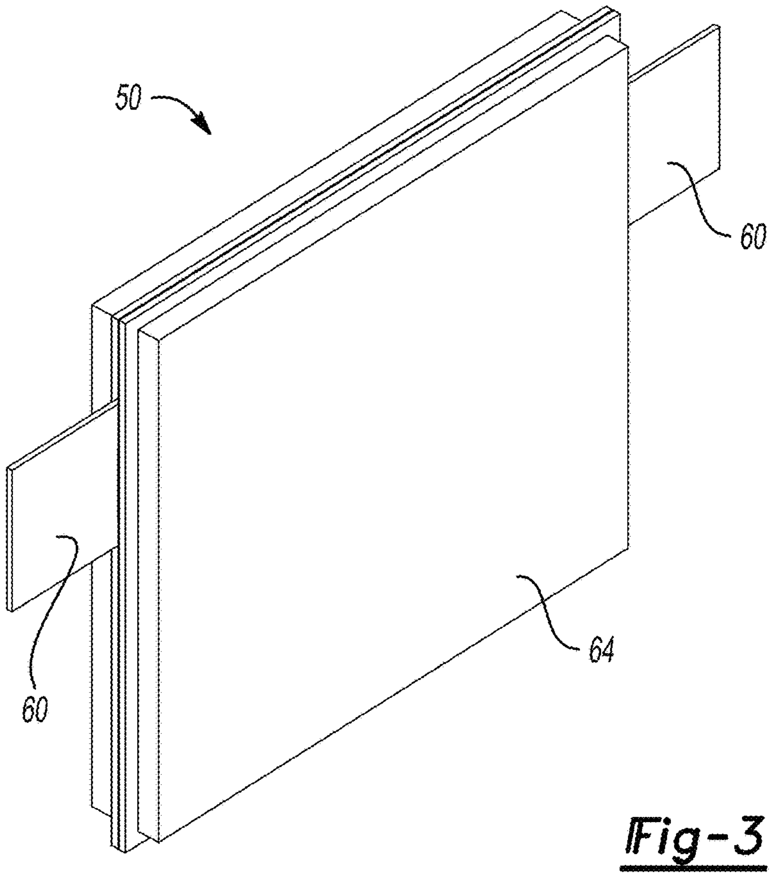
FIG. 3 illustrates a perspective view of a battery cell from the battery pack of FIG. 2.
Figure 2:
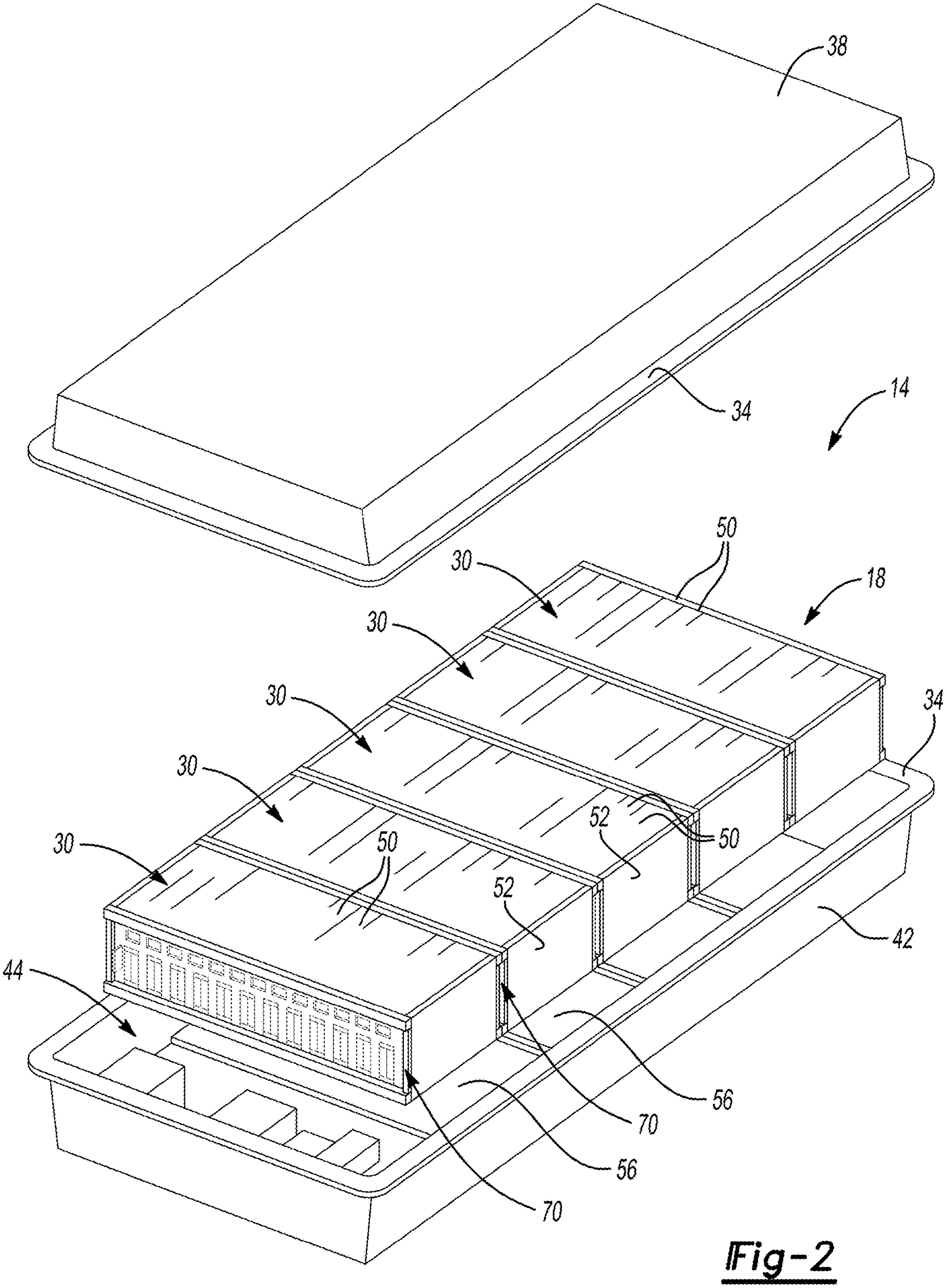
FIG. 2 illustrates an expanded, perspective view of a battery pack from the electrified vehicle of FIG. 1 with cross-member assemblies according to an exemplary embodiment of the present disclosure.

With reference now to FIGS. 2 and 3, the battery pack 14 includes a plurality of cell stacks 30 held within an enclosure assembly 34. In the exemplary embodiment, the enclosure assembly 34 includes an enclosure cover 38 and an enclosure tray 42. The enclosure cover 38 can be secured to the enclosure tray 42 to provide an interior area 44 that houses the cell stacks 30. The enclosure cover 38 can be secured to the enclosure tray 42 using mechanical fasteners (not shown), for example.

Each of the cell stacks 30 includes, among other things, a plurality of battery cells 50 (or simply "cells") stacked side-by-side relative to each along a respective cell stack axis.

The battery cells 50 store and supply electrical power. Although a specific number of the cell stacks 30 and cells 50 are illustrated in the various figures of this disclosure, the battery pack 14 could include any number of the cell stacks 30 each having any number of individual cells 50.

In an embodiment, the battery cells 50 are lithium-ion pouch cells. However, battery cells having other geometries (cylindrical, prismatic, etc.), other chemistries (nickel metal hydride, lead acid, etc.), or both could be alternatively utilized within the scope of this disclosure.

With reference now to FIGS. 4-7 and continuing reference to FIGS. 1-3, the cell stacks 30 are each sandwiched along the cell stack axis between endplates 52, which are disposed at opposing axial ends of the cell stacks 30. The endplates 52 maintain the cell stack 30 in a compressed state along the respective cell stack axis.

Each of the cell stacks 30 is disposed upon a thermal exchange plate 56, which helps manage thermal energy within the cell stack 30 and elsewhere within the battery pack 14. Coolant can be circulated through the thermal exchange plate 56 to cool the cell stacks 30, for example.

Within the cell stacks 30, the individual battery cells 50 can be electrically connected together. The cell stacks 30 can also be connected to each other. To facilitate these electrical connections, the battery cells 50 includes a pair of tab terminals 60 extending from a case 64. The tab terminals 60 of the battery cells 50 can be connected to the tab terminals 60 of other battery cells 50 and to other structures.

Alongside the battery cells 50 are cross-member assemblies 70, which, in this example, include a frame 74, a first beam 78, and a second beam 82. Busbars 86 are mounted to the frame 74. In the example embodiment, each cell stack 30 is positioned between two cross-member assemblies 70.

The tab terminals 60 extend through a plurality of slots 90 in the frame 74. The tab terminals 60 are folded over and connected to the busbars 86. In the exemplary embodiment, the busbars 86 are heat staked to the frame 74, which is a polymer-based material. The frame 74 could be injection molded.

The frame 74, the first beam 78, and the second beam 82 extend longitudinally a length of the cell stack 30. The first beam 78 and the second beam 82 are pultruded beams in this example. A person having skill in this art would be able to structurally distinguish a pultruded beam from a beam that is formed according to another process, such as an extruded beam.

Figure 4:
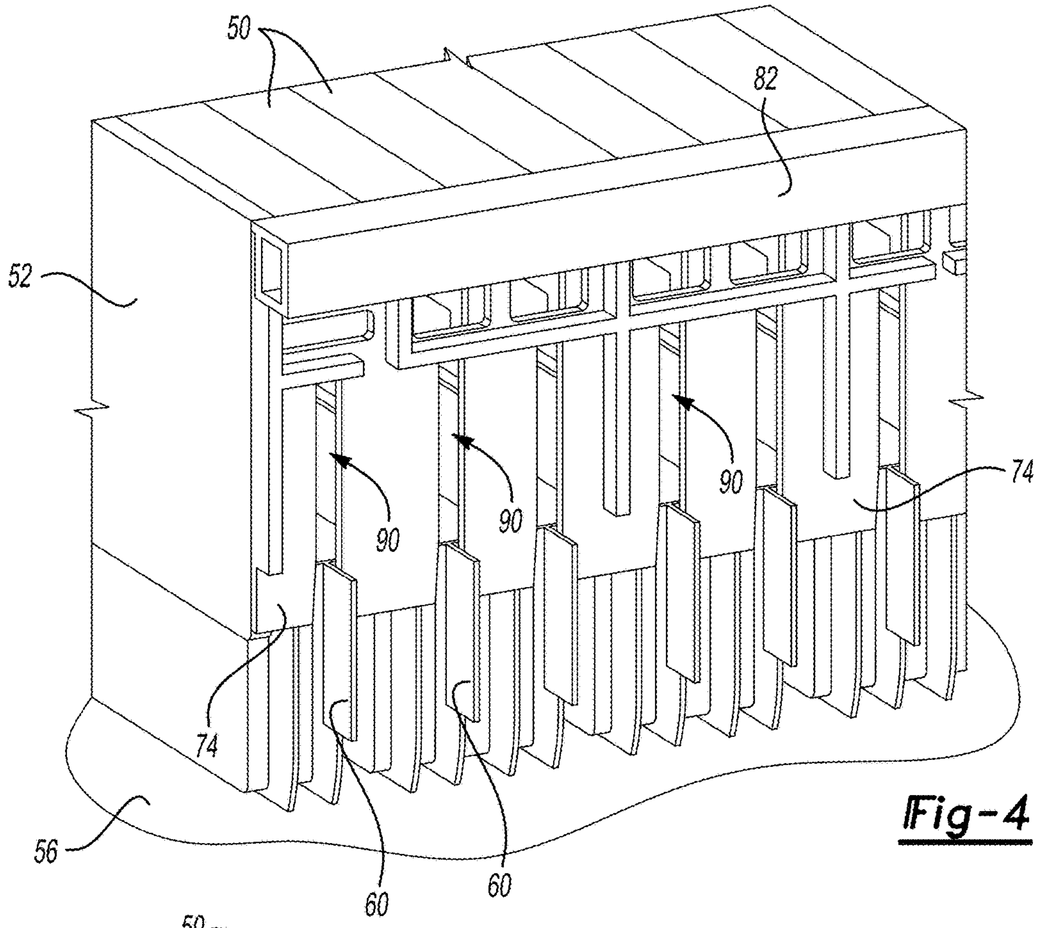
FIGS. 4-7 illustrate close-up perspective views of selected assembly stages associated with installing the cross-member assemblies of the battery pack of FIG. 2.

A method of assembling the cross-member assemblies 70 includes, in this example, includes positioning the cell stack 30 on the thermal exchange plate 56 within the enclosure tray 42. Next, the frame 74 is positioned alongside the cell stack 30 as shown in FIG. 4. The slots 90 in the frame 74 receive the tab terminals 60 as the frame 74 is moved alongside the cell stack 30. The frame 74 can slide vertically downward to position the tab terminals 60 within the slots 90.

In this example, the second beam 82 is secured to the frame 74 when the frame 74 is moved alongside the cell stack 30. The second beam 82 can be adhesively secured to the frame 74, for example.

The first beam 78 is not attached to the frame 74 when the frame 74 is moved alongside the cell stack 30. This allows the slots 90 to receive the tab terminals 60 without interference from the first beam 78.

Figure 5:
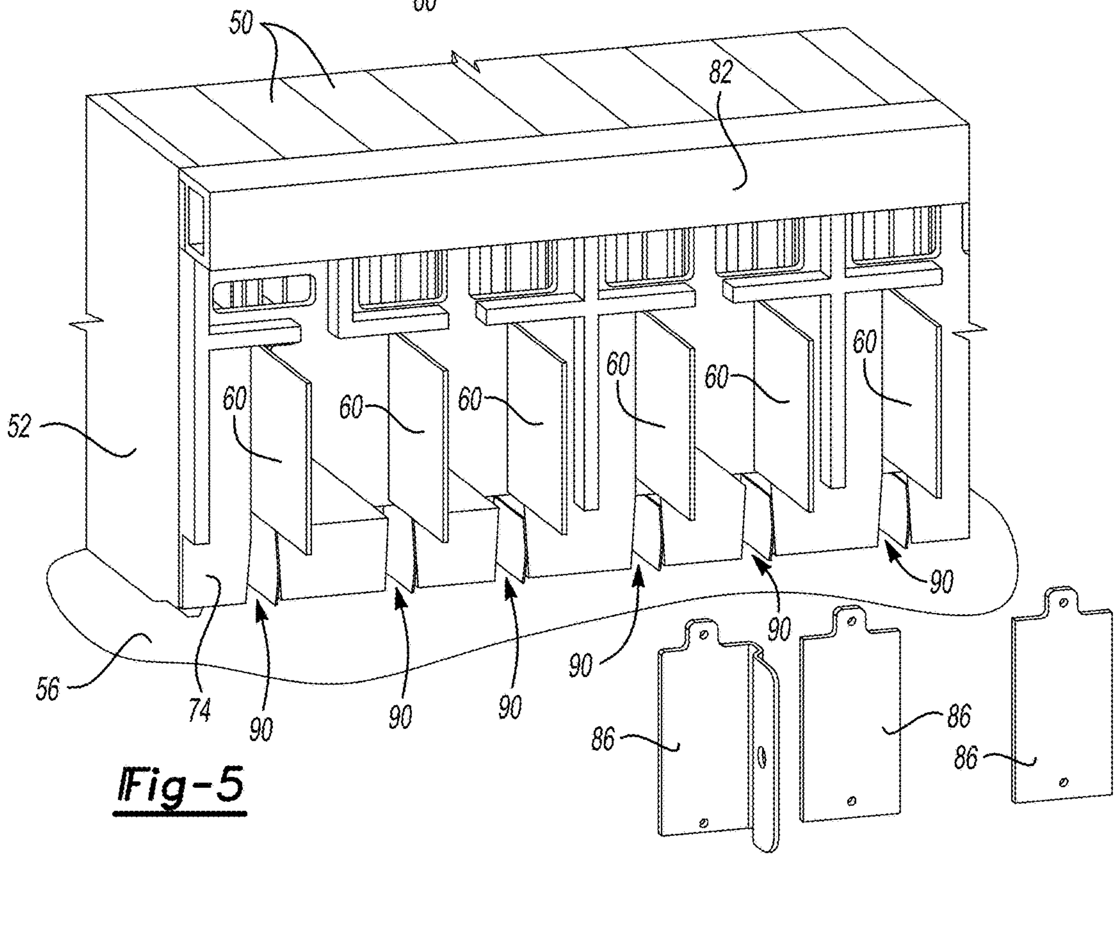
Figure 6:
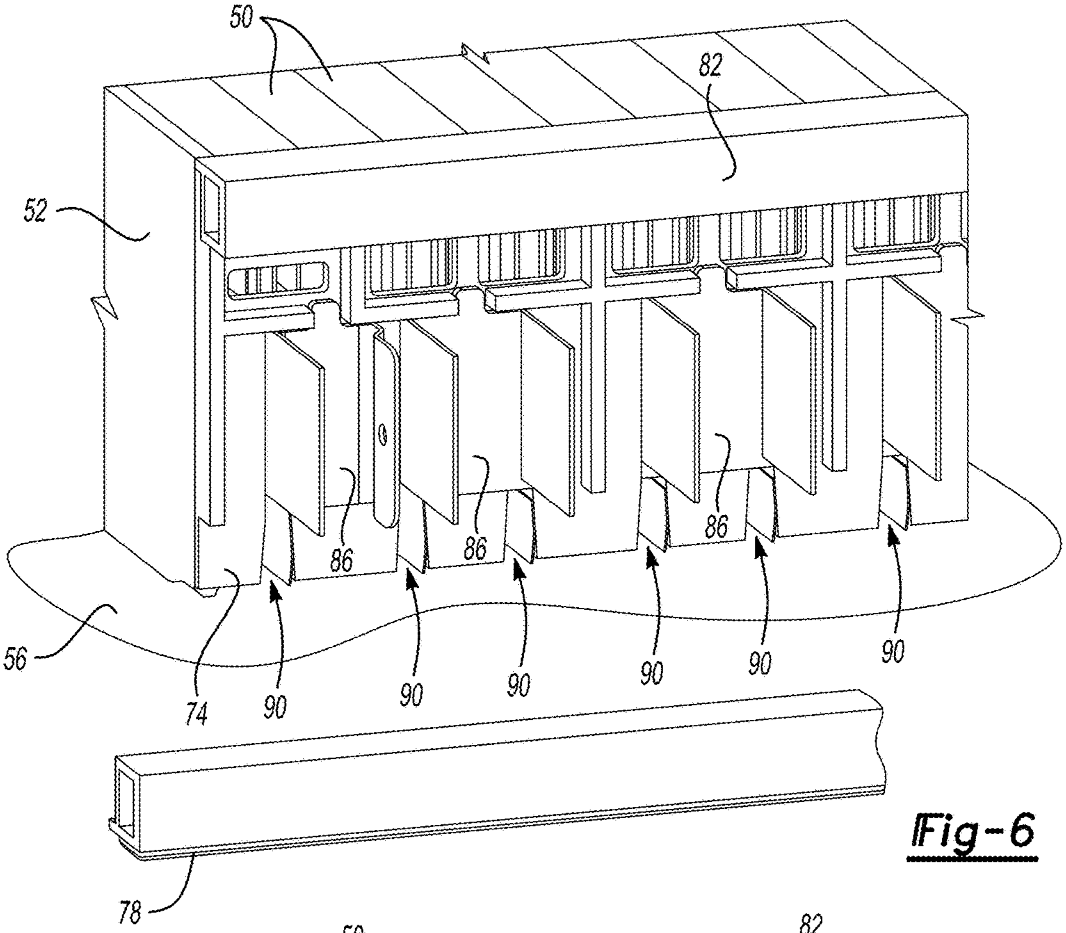

Next, as shown in FIGS. 5 and 6, the busbars 86 are secured to the frame 74. The busbars 86 could be secured to the frame 74 through a heat staking operation, for example.

After the tab terminals 60 are aligned with the busbars 86, the first beam 78 is secured to the frame 74 as shown in FIG. 6. The first beam 78 covers portions of the slots 90 when the first beam 78 is secured to the frame 74. The first beam 78 can be adhesively secured to the frame 74. The first beam 78 can additionally be secured to the thermal exchange plate 56.

In this example, first beam 78 is, when installed, vertically lower than the second beam 82. The first beam 78, which is vertically lower after installation, is secured to the frame 74 after the tab terminals 60 are positioned in the slots 90. In another example, the first beam 78 could be secured to the frame 74 prior to positioning the tab terminals 60 in the slots 90, and the second beam 82, which is vertically higher than the first beam 78, is secured to the frame 74 after the tab terminals 60 are positioned in the slots 90. After securing the first beam 78 to the frame 74, the tab terminals 60 are disposed vertically between the first beam 78 and the second beam 82.

Figure 7:
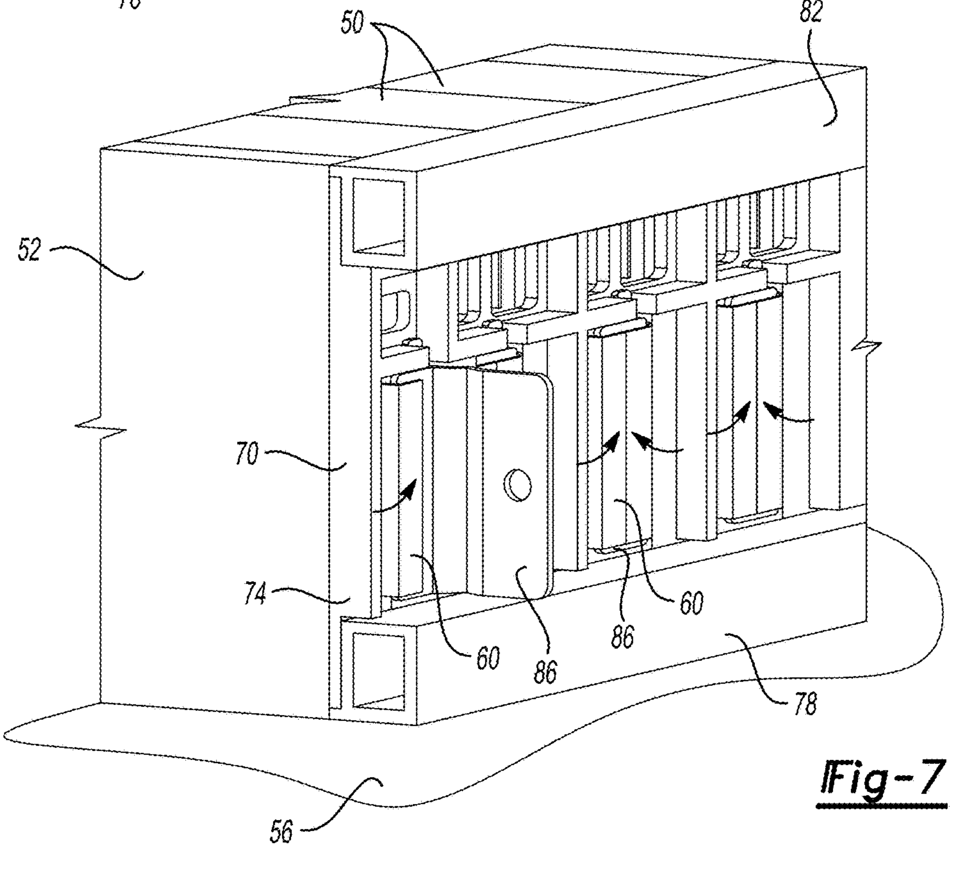

As shown in FIG. 7, the tab terminals 60 are then folded over at least one of the busbars 86, and secured to the busbars 86. The tab terminals 60 can be secured to the busbars 86 using laser welds, for example.

The cross-member assembly 70 on an opposite side of the cell stack 30 can similarly assembled.

Figure 8:
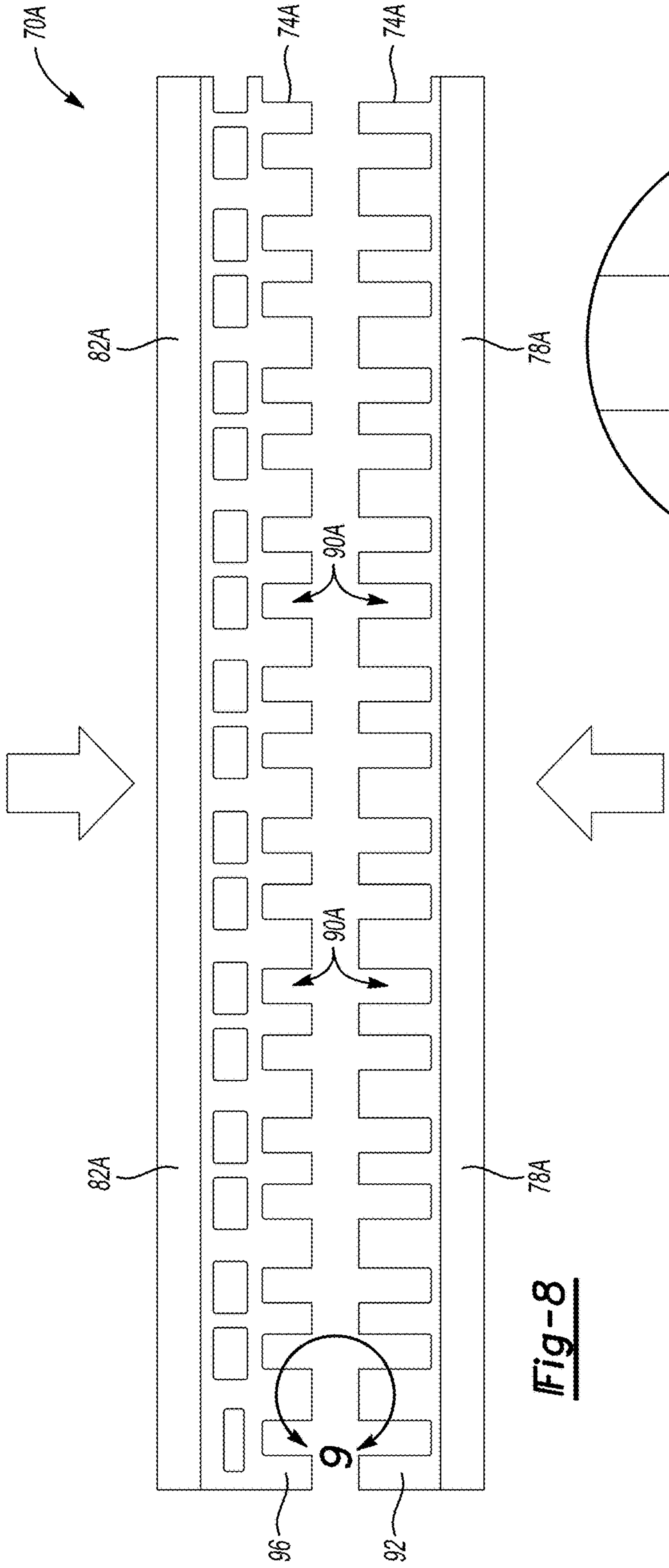
FIG. 8 illustrates a portion of a cross-member assembly according to another exemplary aspect of the present disclosure.

With reference to FIGS. 8, another example embodiment of the cross-member assembly 70A includes a multi-piece frame 74A having a first section 92 and a second section 96. The multi-piece frame 74A includes a plurality of slots 90A that are each partially provided by the first section 92 and partially provided by the second section 96.

A first beam 78A is secured to the first section 92. A second beam 82A is secured to the second section 96. The first beam 78A can be secured to the first section 92 prior to positioning the tab terminals 60 in the slots 90A. The second beam 82A can be secured to the second section 96 prior to positioning the tab terminals 60 in the slots 90A.

Figure 9:
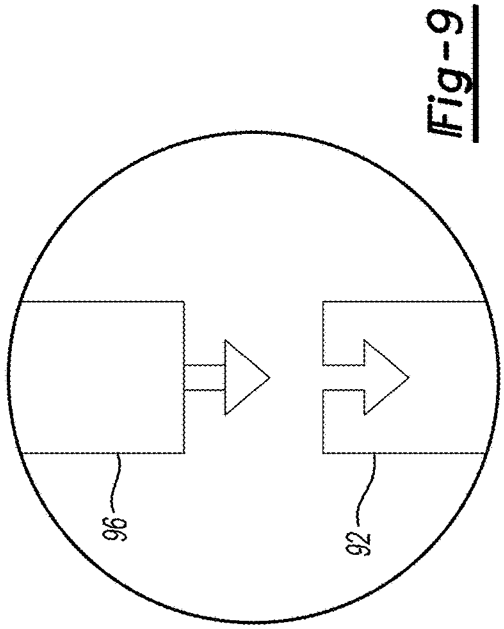
FIG. 9 illustrates a close up view of an area of FIG. 8.

The first section 92 can be snap-fit to the second section 96 as shown in FIG. 9. In other examples, the first section 92 and the second section 96 could be instead or additionally adhesively secured together, or joined in some other way.

Features of some of the examples of this disclosure include providing a path for sliding tab terminals into an installed position. The slots that receive the tab terminals can help to locate the tab terminals when joining the tab terminals to busbars, for example.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A method of assembling a battery pack, comprising:
positioning one or more terminals of a cell stack within a slot that is provided by a frame of a cross-member assembly;
securing a beam of the cross-member assembly to the frame after the positioning; and
during the securing, additionally securing the beam to a thermal exchange plate, the cell stack disposed on the thermal exchange plate.

2. The method of claim 1, wherein the securing comprises adhesively securing the beam to the frame.

3. The method of claim 1, further comprising securing a plurality of busbars to the frame after securing the beam to the frame.

4. The method of claim 3, wherein securing the plurality of busbars comprises heat staking the plurality of busbars to the frame.

5. The method of claim 4, wherein the frame is a polymer-based material.

6. The method of claim 3, further comprising folding the one or more terminals over the plurality of busbars, and then securing the one or more terminals to the plurality of busbars after the folding.

7. The method of claim 6, wherein securing the one or more terminals to the plurality of busbars comprises laser welding the one or more terminals to the plurality of busbars.

8. The method of claim 3, wherein the cross-member assembly is a first cross-member assembly disposed along a first side of the cell stack, the frame is a first frame, and the beam is a first beam, and further comprising positioning one or more terminals within respective slots of a second frame of a second cross-member assembly, and securing a second beam of the second cross-member assembly to the second frame.

9. The method of claim 1, further comprising positioning the cell stack on the thermal exchange plate within an enclosure tray before the positioning of the one or more terminals within the slot.

10. The method of claim 1, wherein, after the securing, the beam covers at least a portion of the slot.

11. The method of claim 1, wherein the positioning includes sliding the frame vertically downward relative to the one or more terminals.

12. A method of assembling a battery pack. comprising:
positioning one or more terminals of a cell stack within a slot that is provided by a frame of a cross-member assembly, wherein the frame is a first section of the frame;
securing a beam of the cross-member assembly to the frame after the positioning; and
securing a second section of the frame to the first section of the frame, the first section providing a first portion of the slot, the second section providing a second portion of the slot.

13. The method of claim 12, wherein the beam is secured to the second section of the frame when the second section is secured to the first section.

14. The method of claim 12, wherein securing the second section of the frame to the first section of the frame comprises snap-fitting the second section to the first section.

15. A method of assembling a battery pack, comprising:
positioning one or more terminals of a cell stack within a slot that is provided by a frame of a cross-member assembly;
securing a first beam of the cross-member assembly to the frame after the positioning, wherein a second beam is secured to the frame when positioning the one or more terminals within the slot of the frame.

16. The method of claim 15, wherein the first beam is a vertically lower beam and the second beam is a vertically upper beam.

17. The method of claim 16, wherein, after the positioning and the securing, the terminals are disposed vertically between the first beam and the second beam.

18. The method of claim 15, wherein the first beam and the second beam are each a pultruded beam.

19. The method of claim 15, wherein the second beam is adhesively secured to the frame.

20. The method of claim 15, wherein the frame, the first beam, and the second beam each extend longitudinally a length of the cell stack.

* * * * *